(12) United States Patent
Börner et al.

(10) Patent No.: US 8,085,299 B2
(45) Date of Patent: Dec. 27, 2011

(54) DIGITAL LINE SCAN CAMERA

(75) Inventors: Anko Börner, Berlin (DE); Andreas Eckardt, Berlin (DE); Frank Lehmann, Berlin (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 564 days.

(21) Appl. No.: 12/211,949

(22) Filed: Sep. 17, 2008

(65) Prior Publication Data
US 2009/0073280 A1 Mar. 19, 2009

(30) Foreign Application Priority Data
Sep. 17, 2007 (DE) .................. 10 2007 044 314

(51) Int. Cl.
*H04N 7/18* (2006.01)
*H04N 5/228* (2006.01)
(52) U.S. Cl. ...... 348/145; 348/143; 348/144; 348/222.1
(58) Field of Classification Search .............. 348/49, 348/50, 295, 143–145; 356/3.07; 381/318; 396/9
See application file for complete search history.

(56) References Cited

U.S. PATENT DOCUMENTS

| | | | |
|---|---|---|---|
| 4,951,136 A | 8/1990 | Drescher et al. | |
| 5,654,549 A * | 8/1997 | Landecker et al. | 250/332 |
| 5,764,285 A * | 6/1998 | Ochi et al. | 348/222.1 |
| 6,023,291 A * | 2/2000 | Kamel et al. | 348/147 |
| 6,473,119 B1 | 10/2002 | Teuchert | |
| 6,912,464 B1 | 6/2005 | Parker | |
| 7,126,630 B1 * | 10/2006 | Lee et al. | 348/218.1 |
| 2002/0004691 A1* | 1/2002 | Kinashi et al. | 701/4 |
| 2002/0145674 A1* | 10/2002 | Nakamura | 348/296 |
| 2007/0126867 A1* | 6/2007 | McCutchen | 348/143 |
| 2007/0292046 A1* | 12/2007 | Johnson | 382/275 |

FOREIGN PATENT DOCUMENTS

| | | |
|---|---|---|
| DE | 3802219 | 8/1989 |
| DE | 10 2004 027 341 | 12/2005 |
| WO | WO 2005/119178 | 12/2005 |

\* cited by examiner

*Primary Examiner* — Lin Ye
*Assistant Examiner* — John H Morehead, III
(74) *Attorney, Agent, or Firm* — Cozen O'Connor

(57) ABSTRACT

Disclosed is a digital line scan camera, having at least at least one focal plane, on which at least one linear photosensitive sensor is arranged, an objective lens, and a location measurement system. The location measurement system is used to determine six external location parameters, where the location system measurement comprises a satellite-supported position determination device and an inertial navigation measurement unit. The line scan camera includes at least on two-dimensional photosensitive sensor, which is synchronously driven with the linear sensor. At least one displacement vector ($\vec{x}$) is calculated from the data of the minimum of one two-dimensional photosensitive sensor, and where the displacement vector ($\vec{x}$) is used to correct the date of the inertial measurement unit.

19 Claims, 2 Drawing Sheets

DIGITAL LINE SCAN CAMERA

BACKGROUND OF THE INVENTION

1. Field of the Invention

The invention pertains to a digital line scan camera

2. Description of the Related Art

Line scan cameras offer higher resolution than matrix cameras. Accordingly, satellite cameras are designed today almost exclusively as line scan cameras. Aerial cameras for aircraft are designed either as line scan or as matrix cameras. In a line scan camera, a complete picture is obtained by the relative movement between the line scan camera and the object, where the linear sensor is activated each time that movement by a certain distance has occurred. Typically this distance is equivalent to no more than one pixel. The complete image is then assembled from the totality of the linear image sections. So that the image sections can be assembled properly, it is necessary to know the external orientation of the individual scans, this orientation is defined by six parameters, 3 translation parameters and 3 rotation parameters. The internal orientation describes the location of the focal plane relative to the principal point of the objective lens and, as a result, characterizes a viewing direction in the camera coordinate system for each detector element. Once the internal and external orientations are known, a direct relationship can be established between the object points and the image points i.e., the pixels. An initially two-dimensional local coordinate can thus be assigned to object points identified in images. The knowledge of one coordinate such as the projection height, enables the correct determination of the two other coordinates in the world coordinate system (georeferencing).

One method of determining the external parameters with high precision is to combine a satellite-supported position determination device such as a GPS with a high-precision inertial navigation measurement unit (IMU=Inertial Measurement Unit). Strict requirements are imposed on the stability and relative accuracy of the measurements made by the IMU to determine the three angles. Stability here is a measure of the sensitivity of the system to low-frequency changes, whereas relative accuracy is a measure of higher-frequency changes. High stability is when the angular change during straight-ahead flight is less than $½°$ per hour. A high relative accuracy is present when the deviation is less than $\frac{1}{100}°$. IMUs which fulfill both conditions are relatively expensive today, costing in the neighborhood of 150,000 €.

IMUs are also known which have either high stability but low relative accuracy or low stability but high relative accuracy. Although these are comparatively inexpensive, they do not fulfill the accuracy requirements imposed on the angle determination of a location measurement system of a digital line scan camera.

A line scan camera comprising a focal plane, on which three linear sensors and four matrix sensors are arranged is disclosed in DE 38 02 219 A1. The matrix sensors are synchronously activated with each other, where the clock frequency is slower than that of the linear sensors. The orientation of the line scan camera is determined from the displacement between two successive images recorded by the matrix sensors. Two successive images recorded by the matrix sensors may not overlap each other too much; the overlap should not exceed 80% and should instead be in the area of approximately 60%. The reason for the overlaps is that it is impossible to distinguish between translational and rotational movements if the displacements are too small. It is impossible, in the case of a displacement by exactly one pixel, to determine whether a translation by one pixel has occurred or just a pitching movement of the camera. Thus the matrix sensors must cover an area large enough to ensure that they can detect a sufficiently large displacement.

Systems are also known which reference of the image data based on ground control points (GCPs), for which purpose three precisely measured control points are required.

SUMMARY OF THE INVENTION

The invention is based on the technical problem of creating a digital line scan camera in which the external location parameters are determined at lower cost.

In one embodiment, the digital line scan camera comprises at least one focal plane, on which at least one linear photosensitive sensor is arranged, an objective, and a location measurement system.

The location measurement system is used to determine the six external location parameters. The location measurement system comprises a satellite-supported position determination device and an inertial navigation measurement unit. The line scan camera comprises at least one two-dimensional photosensitive sensor, which is synchronously with the linear sensor. At least one displacement vector is calculated from the data of at least one photosensitive sensor, and the displacement vector is used to correct the data of the inertial navigation measurement unit.

As a result, it is possible to use an inertial navigation measurement unit with high stability but low relative accuracy for example, worse than $\frac{1}{100}°$, because the high-frequency changes of the angles are determined by the displacement vector. Because three rotational angles must be corrected in the normal case, a two-dimensional displacement vector is not sufficient i.e., 2 measurement values for 3 unknowns. Nevertheless, if the displacement is large enough, i.e., a displacement of several pixels, it is also possible to determine a rotational angle for the displacement. The overlap of the two-dimensional sensors between two successive measurements is preferably greater than 90%, more preferably greater than 95%, and even more preferably greater than 99%.

Preferably, at least one second two-dimensional photosensitive sensor is used, so that two two-dimensional displacement vectors are determined. Thus, four measurement values are available for three unknowns. In general, it is true that the larger the number of two-dimensional sensors used, the better the accuracy with which the rotational angles are determined.

In one embodiment, the two-dimensional sensors are arranged on the same focal plane as the one or more linear sensors. In principle, however, variants are also possible in which the individual sensors are arranged on separate focal planes, which are mounted movably in a focal plane frame and can be calibrated to each other. The various parts of the focal plane in the frame are preferably adjusted by means of piezoelectric actuating elements. It is also conceivable that the two-dimensional sensors are arranged on a separate focal plane with a separate lens system, that form one or more separate matrix cameras. In this case, it is necessary merely to ensure that the matrix camera is mounted rigidly with respect to the digital line scan camera itself.

The two-dimensional sensors preferably have a size in the range between 64×64 and 1024×1024, where smaller sizes are preferred because of their faster read-out speed. Nevertheless, it is possible to increase the read-out speed of larger sensors by reading out only a portion of the matrix.

In another embodiment, the pixel size of the two-dimensional sensor is preferably smaller than or equal to half the pixel size of the linear sensor, so that the scanning theorem is geometrically satisfied. For many applications the pixel size of the two-dimensional sensor is equal to that of the linear sensor. In the case of slow movements such as those of an airship, it might even be possible to justify the use of pixels of twice the size.

In another embodiment, the two-dimensional sensor is read out at about twice the frequency of the linear sensors in order to satisfy the scanning theorem. On the other hand, it is also true here that the same frequency will often be adequate, and cases are possible in which the frequency can even be lower.

In another preferred embodiment, the one or more two-dimensional sensors are arranged at the edge of the focal plane. As a result, they look farther into the distance and, as a result, respond more sensitively to rotational movements.

The invention is explained in greater detail below based on a preferred exemplary embodiment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like references characters denote similar elements throughout the several views.

DETAILED DESCRIPTION OF THE PRESENTLY PREFERRED EMBODIMENTS

Figure 1:
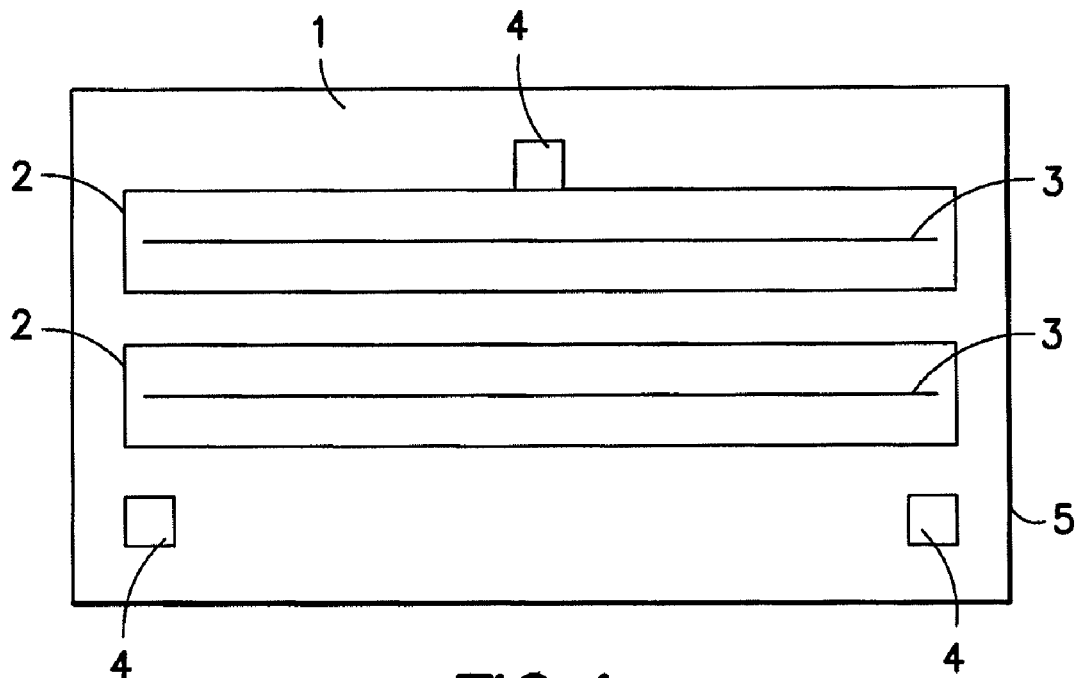
FIG. 1 is a schematic diagram of a focal plane with linear and two-dimensional photosensitive sensors.

FIG. 1 shows a focal plane 1, on which linear photosensitive sensors 2 are arranged. Each linear photosensitive sensor 2 preferably comprises two or more lines 3, which are parallel to each other but offset from each other by a fraction of a pixel. An arrangement of this type is typically referred to as being "staggered". It must be emphasized, however, that a staggered design is not mandatory for the invention. If necessary, a line can also be formed without being staggered such as by several lines arranged one behind the other. The number of linear photosensitive sensors 2 is preferably selected based in part on the application in which he focal plane is used and will typically be between three and five. Three two-dimensional photosensitive sensors 4, are also arranged on the focal plane 1, each of which is preferably placed near an edge 5 of the focal plane 1. As a result, they are a known distance away from the optical axis of the objective lens 6 (see FIG. 2).

The linear photosensitive sensors 2 are responsible for covering the entire surface of the target area. The two-dimensional photosensitive sensors 4 image a small part of the area over which the device is being flown. As a result of the forward movement of the digital line scan camera, the linear photosensitive sensors 2 pass over the target area. A complete picture of the target area is obtained by lining up the linear image strips in a row. In a preferred embodiment, the linear and/or two-dimensional photosensitive sensors 2, 4 are preferably designed as CCD or CMOS sensors.

Figure 2:
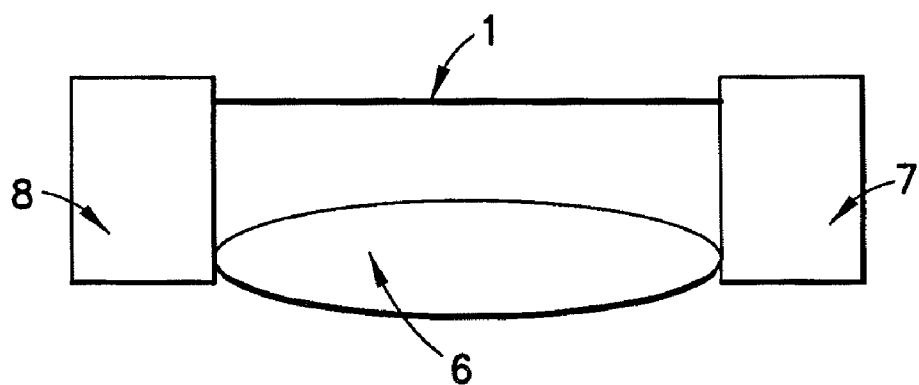
FIG. 2 is a schematic diagram of part of a digital line scan camera.

FIG. 2 shows a schematic diagram of the focal plane 1 with the objective lens 6. Satellite-supported position determination device 7 and an inertial navigation measurement unit 8 are arranged rigidly with respect to each other, to the focal plane 1, and to the objective lens 6. The satellite-supported position determination device 7 determines the special coordinates X, Y, Z, and the inertial navigation measurement unit 8 determines the space angles α, β, γ. The inertial navigation measurement unit 8 has a high degree of stability but only a low relative accuracy, so that high-frequency movements are not detected satisfactorily.

Figure 3:
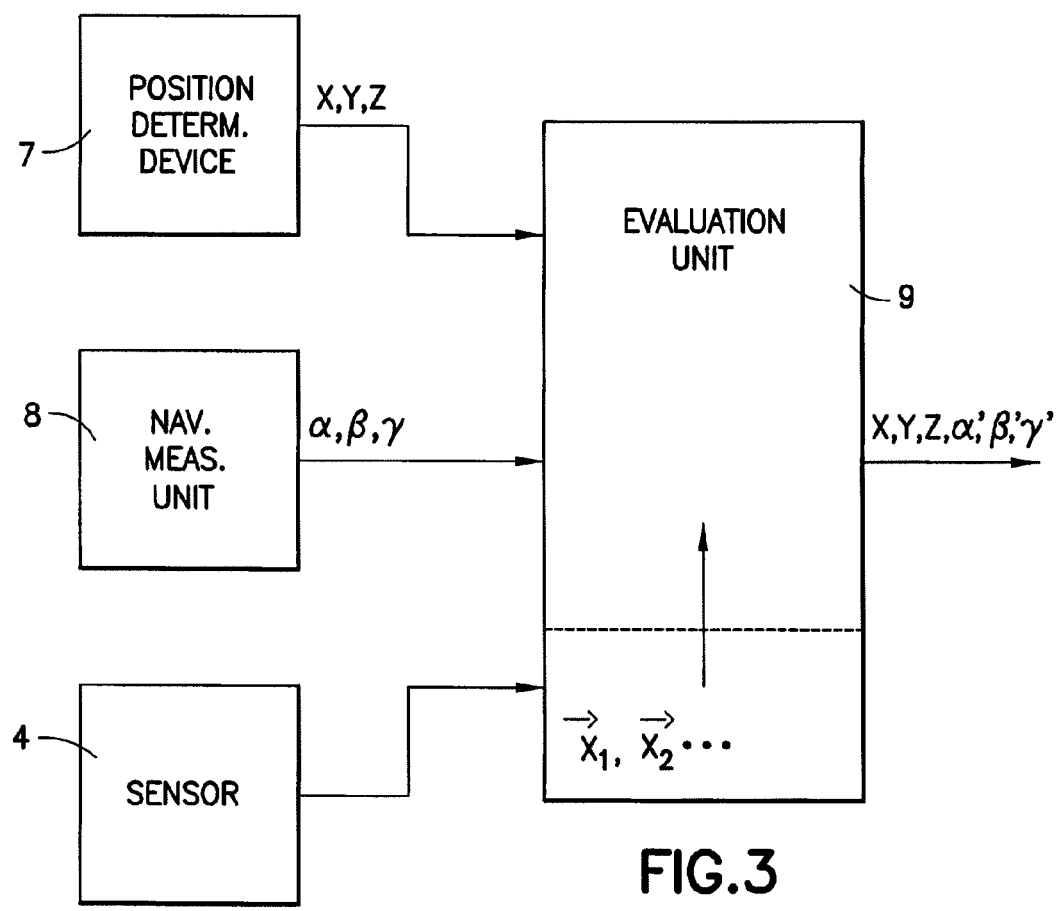
FIG. 3 is a schematic functional block diagram of the correction of the data of the inertial navigation measurement unit.

The process is now to be explained based on FIG. 3. In a first embodiment, the sensors 2 and 4 are read out at the same clock frequency. The clock frequency is coordinated with the speed of the carrier such as an airplane, so that a new read-out is made after a displacement by one pixel. Because the movement is not ideal, the exact location and position of the lines must be known every time a read-out is performed. The satellite-supported position determination device 7 provides highly precise position data X, Y, Z, where the inertial navigation measurement device provides relatively imprecise space angles α, β, γ. The data of the position determination device 7 serve simultaneously to support the data of the inertial navigation measurement device 8. The data is sent to an evaluation unit 9, which simultaneously evaluates the data of the two-dimensional sensors 4 at time t and (t−1). The evaluation unit 9 determines a displacement vector $\vec{x}$ for each two-dimensional sensor 4. From these displacement vectors $\vec{x}_1, \vec{x}_2, \ldots$ it is then possible to estimate movement parameters such as roll, pitch, and yaw. The space angles α, β, γ, can then be corrected by means of these movement parameters, so that highly precise space angles α', β', γ' involving high-frequency movements are thus made available.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A digital line scan camera comprising:
   at least one focal plane;
   at least one linear photosensitive sensor arranged on the at least one focal plane;
   at least one two-dimensional photosensitive sensor arranged on a second focal plane, the at least one two-dimensional photosensitive sensor synchronously driven with the linear sensor;
   an objective lens arranged a distance from the at least one focal plane;
   a location measurement system comprising a satellite-supported position determination device and an inertial navigation measurement unit, the location measurement system fixedly arranged with respect to the at least one focal plane, the location measurement system configured to determine six external location parameters; and an evaluation unit configured to calculate at least one displacement vector ($\vec{x}$) from data of the at least one two-dimensional photosensitive sensor, wherein the evaluation unit is further configured to use the displacement vector ($\vec{x}$) to correct data of the inertial navigation measurement unit.

2. The digital line scan camera according to claim 1, wherein the at least one two-dimensional photosensitive sensors comprises at least two two-dimensional photosensitive sensors.

3. The digital line scan camera according to claim 1, wherein the at least one two-dimensional photosensitive sensors are each arranged on the same focal plane as the at least one linear photosensitive sensor.

4. The digital line scan camera according to claim 1, wherein the at least one two-dimensional photosensitive sensor has a step of at least 64×64 pixels.

5. The digital line scan camera according to claim 1, wherein the at least one two-dimensional photosensitive sensor has a size each to or less than 1024×1024 pixels.

6. The digital line scan camera according to claim 1, wherein the at least one two-dimensional photosensitive sensor has a size between 64×64 and 1024×1024 pixels.

7. The digital line scan camera according to claim 1, wherein a pixel size of the at least one two-dimensional photosensitive sensor is less than or equal to half a pixel size of the at least one linear photosensitive sensor.

8. The digital line scan camera according to claim 1, wherein the at least one two-dimensional photosensitive sensor is read out at twice a frequency at least one of the linear photosensitive sensor.

9. The digital line camera according to claim 1, wherein the at least one two-dimensional photosensitive sensor is arranged at an edge of the at least one focal plane.

10. The digital line camera according to claim 3, wherein the at least one two-dimensional photosensitive sensor is arranged at an edge of the at least one focal plane.

11. The digital line camera according to claim 1, wherein at least one of the at least one two-dimensional photosensitive sensor and the at least one linear photosensitive sensor is a CCD sensor.

12. The digital line camera according to claim 1, wherein at least one of the at least one two-dimensional photosensitive sensor and the at least one linear photosensitive sensor is a CMOS sensor.

13. The digital line scan camera according to claim 1, wherein the at least one linear photosensitive sensor comprises at least two parallel lines offset by at least a fraction of a pixel.

14. The digital line scan camera according to claim 1, wherein the at least one linear photosensitive sensor comprises at least two lines that are not staggered.

15. The digital line camera according to claim 1, wherein the focal plane, the objective lens, and the location measurement system are rigidly arranged with respect to one another.

16. The digital line scan camera according to claim 1, wherein the inertial navigation measurement unit has a high degree of stability and a low relative accuracy.

17. A method for correcting data of an inertial navigation unit, the method comprising:
receiving data from at least one linear photosensitive sensor arranged on a first focal plane at a first and second time;
receiving data from at least one two-dimensional photosensitive sensor arranged on a second focal plane at a first and second time;
driving the at least one linear photosensitive sensor in synchrony with the at least one two-dimensional photosensitive sensor;
receiving position data from a satellite-supported position determination device at the first and second time;
receiving space angle data from an inertial navigation measurement unit at the first and second time;
determining a displacement vector for the at least one two-dimensional photosensitive sensor based in part on the data received at first and second time;
determining movement parameters based in part on the determined displacement vector; and
correcting the space angles based in part on the movement parameters.

18. The method according to claim 17, further comprising movement parameters are roll, pitch, and yaw.

19. The digital line camera according to claim 18, further comprising determining movement parameters based in part on the determined displacement vector, wherein the data is received in synchronization with a single clock frequency.

* * * * *